May 12, 1964  H. S. OTT  3,132,808
MIXING APPARATUS
Filed Feb. 20, 1961  3 Sheets-Sheet 3
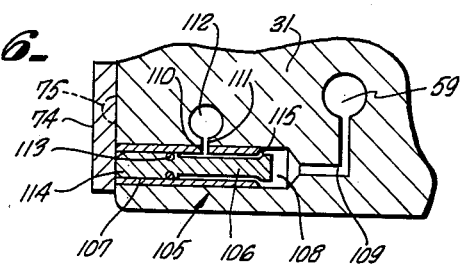
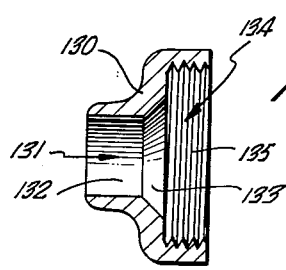
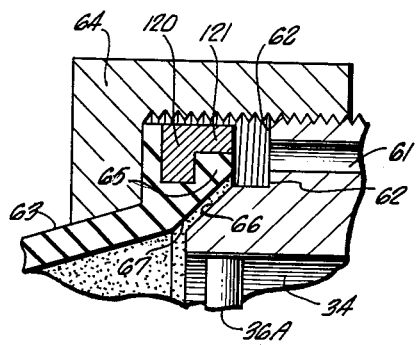
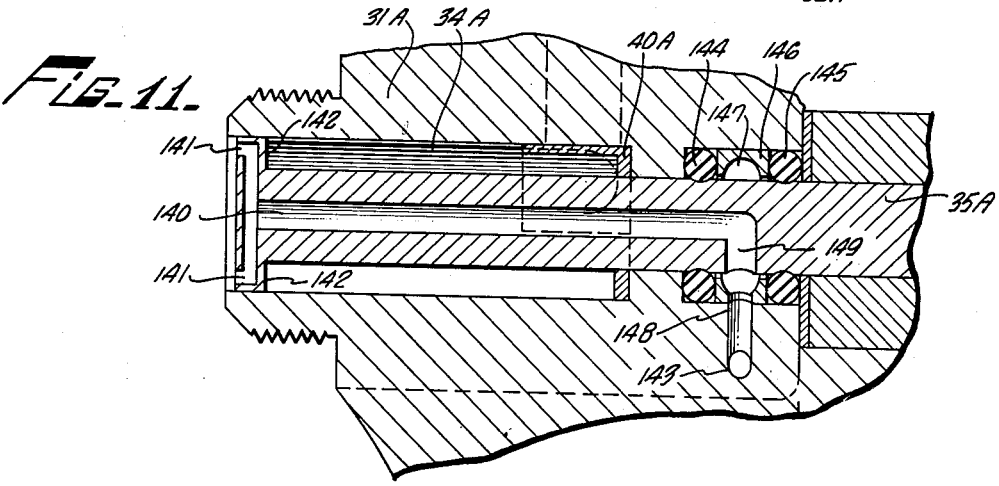
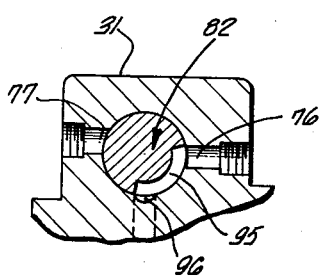
INVENTOR.
HERMAN S. OTT
BY
Christie, Parker & Hale
ATTORNEYS.

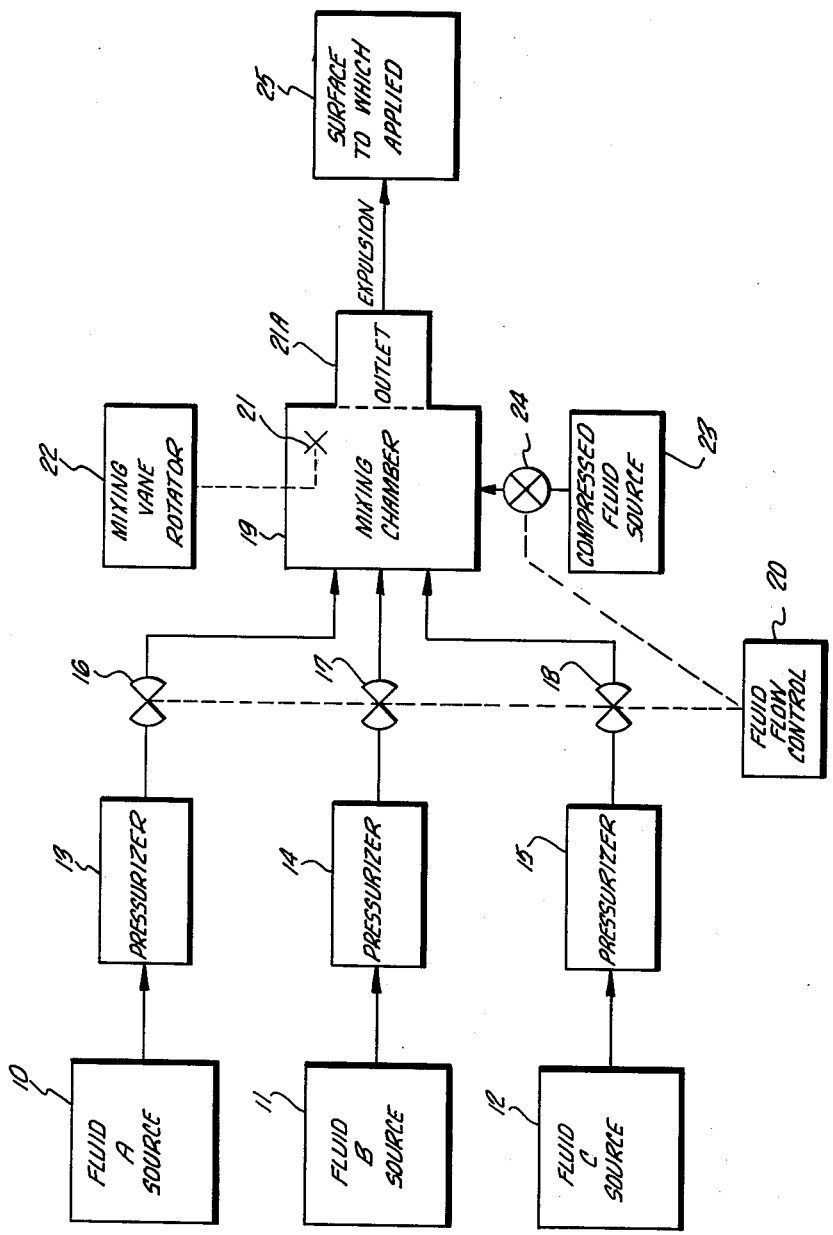

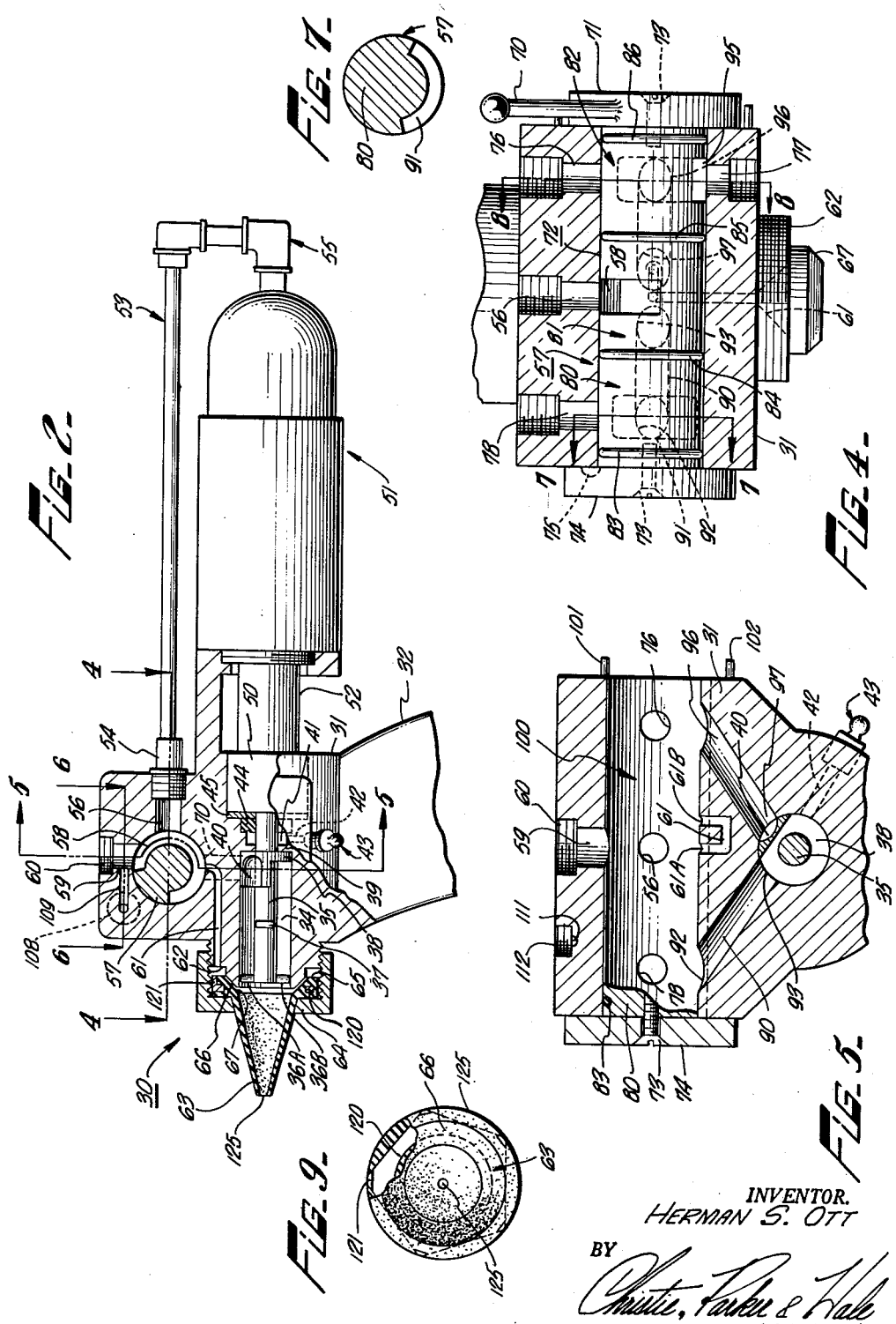

United States Patent Office 3,132,808
Patented May 12, 1964

3,132,808
MIXING APPARATUS
Herman S. Ott, Temple City, Calif., assignor to Spra-Flo Equipment Co., Inc., Monrovia, Calif., a corporation of California
Filed Feb. 20, 1961, Ser. No. 90,391
10 Claims. (Cl. 239—415)

This invention relates to apparatus for mixing together two or more liquids, at least one of which is quite viscous, and is particularly applicable to the production of polyurethane and epoxy resins, and applying them by pouring or spraying.

The reaction product of isocyanates, either as diisocyanates or polyisocyanates, with one of a group of well-known liquid organic resins bearing a plurality of free hydroxyl groups is known as polyurethane. The plastic material which is the reaction product is formed by the reaction of the free hydroxyl groups in the organic resin with the free isocyanate groups in the isocyanate compound. In order to provide a foamed composition, a blowing agent, such as water or a low boiling halogenated organic liquid, is added to the combination. In the ensuing exothermic reaction, a gas is liberated which is trapped in the reacting mass to provide the foamed end product. This type of production of polyurethanes is well-known.

It is often advantageous to mix together the components so as to produce the polyurethane at the site of its application. Numerous devices currently exist for the mixing together of the various components to produce the required product. However, the more recent commercially available polyurethane foam-forming mixtures have been so viscous as often to render such conventional mixing devices ineffective. For example, the foam may form and harden within the device itself, thus clogging of the device, or one of the foam-forming components may be so viscous as to be incapable of passage through the device.

Problems of the same kind are commonly encountered in the curing of epoxy resins by copolymerization hardeners. One or more of the fluid components may be so viscous so as to render impossible the utilization of conventional mixing apparatus.

The present invention, with respect to method, contemplates the passage of a plurality of fluids, at least one of which is quite viscous, through a mixing chamber coincident with the rotation within the mixing chamber of at least one mixing vane disposed normal to the direction of fluid flow. The apparatus of the invention is constituted by a rotatable drive shaft, having at least one mixing vane extending radially therefrom, disposed within a cylindrical mixing chamber, through which the drive shaft extends axially. The mixing chamber has fluid inlet passages opening thereinto and valve means are provided to control the flow of fluids through these passages into the mixing chamber. In its preferred embodiment, one end of the mixing chamber terminates in a hollow tapering extensible outlet member, through which the homogeneous mixture of fluids is expelled. A flow of a compressed fluid may be introduced into this outlet member in order to facilitate expulsion of the mixed material to provide spray application of the mixture.

The invention may be more readily understood by referring to the accompanying drawings in which:

FIGURE 1 is a block diagram of the method of mixing according to the present invention;

FIGURE 2 is a partial cross-section of one embodiment of the mixing apparatus according to the present invention;

FIGURE 3 is a partially broken away detail view of a portion of FIGURE 2 illustrating the connection between the outlet member and the mixing chamber;

FIGURE 4 is a cross-sectional view taken along lines 4—4 of FIGURE 2;

FIGURE 5 is a partial cross-sectional view taken along lines 5—5 of FIGURE 2;

FIGURE 6 is a partial sectional view taken along lines 6—6 of FIGURE 2;

FIGURE 7 is a partial elevation taken along lines 7—7 of FIGURE 4;

FIGURE 8 is a partial elevation taken along lines 8—8 of FIGURE 4;

FIGURE 9 is a plan view, partially broken away, of the outlet member;

FIGURE 10 is a sectional elevation view of an alternate embodiment of the outlet member; and FIGURE 11 is a partial sectional elevation of an alternate embodiment of the mixing vane of the invention.

Referring now to FIG. 1, there is shown a block diagram of the method of mixing according to the present invention. Fluids from fluid A source 10, fluid B source 11, and fluid C source 12 are applied to pressurizers 13, 14, and 15, respectively. The fluids emerge from the pressurizers at comparatively high pressures, for example, three hundred to five hundred pounds per square inch for fluids having a viscosity greater than one thousand centipoises of room temperature. Three control valves 16, 17 and 18 control the flow of the pressurized fluids from the pressurizers 13, 14 and 15 into a mixing chamber 19. The control valves 16, 17, and 18 are controlled by a fluid flow control 20. The mixing chamber 19 has disposed therein, substantially normal to the direction of flow of fluid through the chamber, a mixing vane indicated at 21. The mixing vane is rotated by a mixing vane rotator 22. A compressed fluid source 23 which may, for example, be compressed air at a pressure of two hundred pounds per square inch, is selectively applied to the mixing chamber 19 through a control valve 24, which is controlled by the fluid flow control 20. The stream of fluid is continuously intersected by the rotation of the mixing vane 21 on passing thereby. The fluids then pass into an outlet 21A, through which they are expelled by the pressure differential between the fluids and the surrounding area, and are applied to a surface 25 where the curing or formation of the material takes place.

Referring now to FIG. 2, there is shown a mixing gun 30 which includes a body member 31 having a handle 32 extending therefrom, which is shown as partially broken away. The body member 31 has a cylindrical mixing chamber 34 extending therethrough, within which is disposed a drive shaft 35, so as to be in axial alignment therewith. The drive shaft 35 has a first vane 36 consisting of a first set of blades 36A and 36B extending therefrom at one end thereof, and a second set of vanes 37 (only one of which is shown in FIG. 2) extending therefrom but spaced from the vanes 36 and angularly displaced ninety degrees with respect thereto. The drive shaft 35 extends through a baffle 38 which is press fitted against a shoulder 39. The baffle 38 has a concave portion 40 which is utilized to direct one of the fluid streams toward the vanes 36 and 37 and to inhibit the mixture of the streams prior to contacting the vanes. The drive shaft 35 extends through the shoulder 39 and through a sealing space 41, which communicates through a passage 42 to a grease seal fitting 43, by means of which the space 41 is filled with grease, so as to provide a seal against the passage of the fluids from the mixing chamber any further in this direction. The seal is completed by a seal ring 44, which may be made of neoprene, for example, and which is held in place by a seal retainer 45, which is bolted by bolts (not shown) to the body portion 31. The drive shaft extends through this seal retainer 45 and connects to a clutch assembly 50, which in turn is connected to a source of motive power, illustrated as an air motor 51, by a connecting shaft 52. The connecting shaft 52 is rotated in response to actuation of the air motor 51 by the application thereto of compressed air or other fluid through a drive fluid inlet system 53, connected between a connector 54 on the upper portion of the body member 31, and an inlet assembly 55 to the rear of the air motor. The connector 54 is contained in a compressible fluid passage 56, which in turn opens onto a valve assembly 57, shown in section, and having a cut away portion 58 to provide a passage between the compressible fluid passage 56 and a compressible fluid inlet 59. A threaded portion 60 permits the attachment of a compressible fluid inlet line to the compressible fluid inlet 59. The compressible inlet line may, if desired, have an on-off valve.

A compressible fluid bypass passage 61 extends from the valve assembly 57 through the body member 31 and opens onto a shoulder 62 (see FIG. 3). An extensible conical outlet 63 is connected to the body member 31 by an attaching ring 64, which is in threaded engagement with the body member 31. Thus the extensible conical outlet 63 and attaching ring 64 close the open end of the cylindrical mixing chamber 34. The extensible conical outlet 63 has a base portion 65 and is held in spaced relationship from the shoulder 62 by the attaching ring 64, as shown in FIGS. 2 and 3. Rotation of the attaching ring 64, so as to alter the engagement of the ring 34 with the body member 11, results in relative movement between the outlet base 65 and the shoulder 62. Appropriate movement of the attaching ring 64 will cause the seating of a frustoconical body member shoulder 66 against a mating outlet shoulder 67 adjacent thereto. The seating of these two shoulders against each other closes the passage which previously existed therebetween from the compressible fluid bypass passage 61 into the outlet member 63.

FIGURE 4 is a sectional view taken along line 4—4 of FIG. 2, showing in greater detail the valve assembly 57 and body member 31. The valve assembly 57 is seen to include an actuating handle 70, which is attached to a valve body 72, and is disposed within an aperture extending laterally across the body member 31. The valve body 72 terminates at one end in the disk-shaped member 71, to which it is connected, for example, by a screw 73, and similarly terminates at the opposite end in a member 74. The member 74 has an indentation 75 shown in dotted lines, the function of which will be discussed with respect to FIG. 6. The screw assembly 73 is utilized by way of illustration only to indicate that the disk members are fixed to, but removable from, the valve body 52. Suitable keying is preferably employed to maintain the relative angular disposition of the disk members 71 and 74 with respect to the valve body 72.

The body member 31 has a first viscous fluid inlet 76, a solvent inlet 77, and a second viscous fluid inlet 78 extending therethrough into the valve aperture so as to open onto the valve body, in addition to the previously mentioned compressible fluid outlets 56 and 61. The valve body 72 may be considered to be divided into first, second and third portions: 80, 81 and 82, by four O-rings 83, 84, 85 and 86, respectively. The first valve body portion 80 is utilized to control the transfer of a second viscous fluid from the second viscous fluid inlet 78 to a second viscous fluid outlet, shown in dotted lines as 90, by means of a recessed valve body portion 91 therein, as is shown in FIG. 7. The second viscous fluid outlet 90 has a first outlet portion 92 which opens onto the valve body portion 80 and a second outlet portion 93 which opens into the mixing chamber 34 (see FIG. 1).

The third body portion 82 similarly has a recessed portion 95 which may be utilized to connect either the solvent inlet 77 or the first viscous fluid inlet 76 to the first viscous fluid outlet 96, which also opens into the mixing chamber 34 at 97. Rotation of the valve body 72 is accomplished by rotating the handle 70 so as to align the appropriate cut-away portion 91, 58 and 95 in the valve body portions 80, 81, and 82, respectively when the inlets and outlets associated therewith to control the flow of fluids to the O-rings 83, 84, 85 and 86 providing seals between the various valve body portions.

If the first viscous fluid is of such a nature as to solidify upon standing, so as to cause binding when the valve is attempted to be rotated, the third valve body portion 82 may be of smaller diameter than the remainder of the valve body and have a Teflon sleeve disposed thereabout so as to make the overall diameter substantially equal to the remainder of the body. The Teflon sleeve provides a lubricating characteristic with respect to the third body portion so as to eliminate any binding which might otherwise occur due to hardening of the first viscous fluid. Of course, it is to be understood that the Teflon sleeve, while preferred in this embodiment of the invention, is not essential to the practice of the invention in its broadest form, and, alternatively, if required, either or both of the other body portions may be similarly equipped with Teflon sleeves.

In FIG. 5, the aperture in the body member through which the valve extends is shown at 100 by partially breaking away the valve body 72, so that only a part of the first portion 80 thereof is shown. The compressible fluid bypass passage 61 is seen to terminate in a pair of inlet passages 61A and 61B. The cut-away portion 58 of the valve body which controls the flow of compressible fluid into the bypass passage 61 is shaped so that fluid may flow through both the passages 61A and 61B only when the valve body is disposed in its maximum counterclockwise position as viewed in FIG. 1. At other times, either, but not both, of the passages 61A and 61B is connected to the compressible fluid source, as appropriate, so as to lessen the quantity of flow of the compressible fluid. A pair of stop lugs 101 and 102 extend outwardly from the valve body 31 and are utilized to limit the amount of rotation which the valve body may undergo by contacting the handle 70, so as to prevent further rotation of the handle.

Referring now to FIG. 6, there is shown a partial sectional view taken along lines 6—6 of FIG. 2 to illustrate the construction of an on-off control valve 105 which may be utilized, for example, to control the actuation of the pressurizers 13, 14 and 15 of FIG. 1. The control valve 105 consists generally of a valve body 106 disposed within a liner 107, which is inserted in an aperture 108 in the body member 31. An L-shaped compressible fluid passage 109 extends between the compressible fluid inlet 59 and the aperture 108. The liner 107 has an aperture 110 therein which is aligned with a passage 111 in the body member 31 opening into a control fluid outlet 112. The valve body 106 is sealed to the valve liner 107 by an O-ring 113. The valve body 106 terminates at one end at a rounded portion 114 which rides against the disk-shaped member 74. The central portion of the valve body 106 is of lesser diameter of the remainder of the valve body so as to provide a passage between the fluid passage 109 and the fluid passage 111 around a circular shoulder 115 on the valve body. Compressed fluid may then flow between the compressible fluid inlet 59 and the control fluid outlet 112. When the disk-shaped member 74 is rotated so that the indentation 75 is aligned with the rounded end 114 of the valve body 106, the pressure of the fluid on the valve body 106 forces the rounded end 114 into the indentation 75. The shoulder 115 then rides against the liner 107 so as to close the compressed fluid passage between the compressible fluid inlet 59 and the control fluid outlet 112. By connecting appropriate connecting lines and a switch to the control fluid outlet 112, pumps, or the like, can be turned on or off at a remote station, as appropriate, by rotation of the valve 57 so as to rotate the disk-shaped member 74 into alignment with the end 114.

In FIG. 7 there is shown the disposition of the valve assembly 57 taken along lines 7—7 of FIG. 4, in which the first body portion 80 is intermediate between its off position and the position in which fluid from the second fluid inlet 78 may pass into the fluid outlet passage 90. Further counter-clockwise rotation of the body portion 80 will cause the cut-away portion 91 to open onto the second fluid inlet 78 simultaneously with opening onto the fluid outlet portion 92 (see FIG. 5).

In FIG. 8 the disposition of the third valve body portion 82 is such that the first viscous fluid passes from the fluid inlet 76 through cut-away portion 95 of the valve body and the fluid outlet passage 96. By rotating the valve body 82 clockwise from the position shown in FIGURE 8, the cut-away portion 95 progressively moves to close the fluid inlet 76, connect the outlet 96 to the solvent inlet 77, and, finally, close the outlet 96 entirely, in which position the apparatus is in its off condition.

In FIG. 9 there is shown a partially broken away view of the extensible outlet member 63. The member 63 has been broken away to show its construction as including a rigid frame 120, in the form of a pentagon, which has feet 121 (see FIG. 1) extending outwardly therefrom so as to insure the positioning of the frame 120 in the center of a base portion 122 of the member 63 during fabrication. By utilizing this frame 120, the base retains its form so as to insure, referring now to FIG. 3, the abutment of the shoulders 66 and 67. This abutment provides a good seal for the compressible fluid passage 61 when desired, and the rigid base insures an even breaking of the seal when the attaching ring 64 is unscrewed, the purpose of which will be subsequently described with respect to the operation of the device.

In operation, the valve is initially in its most clockwise position, i.e. a position forty-five degrees clockwise from the position shown in FIG. 2. All fluid passages are closed in this most clockwise position. The valve body is then rotated to the position shown in FIG. 2, in which the compressible fluid inlet 59 is connected to the drive connection 53 and the bypass passage 61. This actuates the air motor 51 to rotate the drive shaft 35 so that the vanes 36 and 37 rotate and applies compressed fluid to the passage 61. The valve body is then rotated counter-clockwise to the position shown in FIG. 4, which connects the solvent inlet 77 to the first viscous fluid outlet 96 so as to apply solvent to the mixing chamber 34 and extensible outlet 63. This solvent cleans the device. Rotation of the valve to the next counter-clockwise position, i.e. that shown in FIG. 8, closes the solvent inlet 77 and opens the first and second viscous fluid inlets 76 and 78. The viscous fluids then pass through the cut-away portions 91 and 95 and into the mixing chamber through the outlet passages 90 and 96. The pressure under which the fluids are applied forces the fluids through the mixing chamber 34 where the streams are intersected by the rotating vanes 36 and 37. After this intersection, the fluids then pass into the extensible outlet 63 and through an outlet aperture 125 therein. In order to terminate operation, the previously described sequence is reversed. Application of solvent during this reverse sequence insures that the apparatus is cleaned prior to discontinuing use.

The apparatus according to the invention may be utilized to apply the mixed material either as a more-or-less solid stream or as a spray. If the material is to be applied in a stream, so as to resemble application by pouring, the attaching ring 64 (see FIG. 3) is rotated so as to bring together the shoulders 66 and 67, thus closing the fluid passage between the compressible fluid passage 61 and the interior of the nozzle. This prevents the injection of the compressible fluid into the nozzle, so that the force for expulsion of the mixed stream from the apparatus is provided solely by the pressures at which the mixed fluids are applied to the mixer. If, however, it is desired to apply the mixed stream as a spray, the attaching ring 64 is unscrewed so as to permit a fluid passage to exist between the two shoulders 66 and 67, as is shown in FIG. 3. The compressible fluid from the compressible fluid passage 61 then passes into the nozzle and mixes with the mixed fluid stream therein. The compressible fluid is under pressure and aids in the expulsion of the mixed stream from the nozzle as well as causing it to be expelled as a spray rather than as a solid stream.

The rigid base construction of the nozzle 63 permits the rapid changing from a pouring to a spraying operation while continuously applying the material. Thus if a non-rigid base were used with the nozzle, the portion of the base adjacent the passage 61 would move so as to form a fluid passage between the shoulders 66 and 67 on the unscrewing of the attaching ring 64, while the remainder of the base would remain adjacent the shoulder 66. In such operation, unsatisfactory combination of the compressible fluid and the mixed stream occurs, so that a good spraying characteristic is not achieved. However, by utilizing the rigid base nozzle of the present invention, an even distribution of the compressible fluid into the nozzle is achieved to insure good mixing and an even spraying characteristic.

By way of example as to the utilization of the apparatus of FIG. 2, the apparatus may be utilized quite effectively in the continuous application of a recently developed product called Dyna-Therm 100, which is produced by the Plas-Kem Corporation, division of the Dyna-Therm Checimal Corporation of Los Angeles, California. This product is of the type in which a polyurethane foam composition is produced by the combination of two liquid components. Conventional applicators are unable to continuously apply this product. A Brookfield Viscosimeter was utilized at an ambient temperature of seventy-eight degrees and twenty revolutions per minute was utilized to determine the viscosity of the two parts to be mixed together. The more viscous, or A part, using a number seven spindle, indicated a viscosity of 104,000 centipoises, and the less viscous, or B part using a number four spindle, indicated a viscosity of 6,200 centipoises. The A part has a density of eleven pounds per gallon, and the B part, a density of ten and one-half pounds per gallon. The rate of mixture of the two parts on a volume ratio is 1.45 parts A per part of B, and, on a weight ratio, 1.6 part A per part of B.

In order to insure the appropriate ratio of mixing, metered feeding under pressure of the two components is utilized. Such metered feeding can be accomplished in a variety of conventional methods, perhaps the easiest of which is the utilization of a gear pump arrangement. Utilizing a feed rate of one pound per minute of the combined mixture, i.e. 61.5 percent by weight of A and 38.5 percent by weight of B, into a mixer having a mixing chamber diameter of five-eighths of an inch, and a mixing shaft diameter of one-quarter of an inch, a homogeneous mixture was obtained for all vane rotational rates in excess of 6,000 revolutions per minute. Below 6,000 revolutions per minute the rotational rate proved to be insufficient to provide for a homogeneous mixture. Upon increasing the feed rate to two pounds per minute, a rotational rate in excess of 12,000 revolutions per minute was required in order to provide for good mixing.

It, of course, should be appreciated that the air motor utilized must be capable of generating sufficient torque to provide for the rotational rate necessary for making a homogeneous mixture. For example, utilizing one pound per minute feed rate of the above materials and a five-eights horsepower air motor, the air motor was required to produce the 0.49 inch-pounds of torque at 6,250 revolutions per minute in operation, the torque increasing with an increasing rate of revolution, until, at 50,000 revolutions per minute, the air motor was required to deliver 3.47 inch pounds of torque.

In order to provide for the passage of the two materials from the mixing chamber and their expulsion from the nozzle, the A part was applied to the mixer at a pressure of 450 pounds per square inch, and the B part at a pressure of 300 pounds per square inch. These pressures were sufficient to provide a maximum feed rate in excess of two pounds per minute. An increase in the fluid pressures permits an increase in the maximum feed rate obtained. However, it may be necessary to utilize an air motor of greater power in order to provide for a sufficiently high rotational rate to form a homogeneous mixture at extremely high feed rates.

The embodiment illustrated in FIGS. 1 through 9 has been shown as having a pair of vanes 36 and 37. However it has been found that the vane 37, that vane remote from the mixing chamber outlet, does not add significantly to the performance of the mixer and can be eliminated. It has further been found that a relationship exists between the rotation rate of the vane, the apparent velocity of the fliuds past the vane, and the number of blades in the vane, the vane referred to being the vane adjacent the outlet of the mixing chamber. The apparent velocity of the fluid stream past the vane is given by the formula $$\frac{x}{dA}$$

where:

$x$ = the feed rate of the fluid stream in pounds per minute
$d$ = the density of the fluid stream in pounds per cubic inch
$A$ = the difference in area in square inches between the cross-sectional area swept by the rotation of the vane and the area of the vane. If:
$r$ = the revolutions per minute of the vane, and
$n$ = the number of blades in the vane, then the apparent velocity divided by the product of the revolutions times the number of blades will give an apparent thickness of the fluid stream passing between the adjacent blades.

It has been found that for material, one of which has a viscosity of the general magnitude of the A part previously referred to, this apparent thickness should be less than 0.006 inch. It should be noted that, in the above embodiment, the vane is disposed in the mixing chamber so that its blades extend substantially completely diametrically across the chamber. Of course, it would be possible to utilize a mixing vane having only one blade, or having three or more blades. In order to provide for optimum performance, the vane blades should be disposed in a plane perpendicular to the axis of motion of the drive shaft rather than canted thereto, thus lying in the plane of the circular cross-section of the mixing chamber. Each vane should extend outwardly toward the chamber wall so as to provide for a minimum of clearance between the blade tip and the wall. If vanes which are canted are used, the area of the vane should be computed for the above formula, as the area which the vane projects onto the circular cross-section of the mixer chamber, for example, by multiplying the actual area by the cosine of the angle of canting, the blades of FIG. 2 being canted zero degrees.

Referring now to FIG. 10, there is shown an alternate embodiment of the outlet nozzle of the invention. This embodiment is utilized where a well-directed stream of spray is not required. The outlet nozzle consists of a rigid body portion 130 having an aperture 131 extending therethrough. The aperture 131 has a cylindrical outlet portion 132 which opens on its upstream side onto a frustoconically tapering shoulder 133. The frustoconically tapering shoulder 133 terminates in an attaching portion 134 which has threads 135 for attaching the nozzle to the body member 31 in the same manner as the attaching ring 64 was attached.

In FIG. 11 there is shown an alternate embodiment of the mixing vane and compressible fluid passage. In this embodiment a body member 31A has a cylindrical mixing chamber 34A therewithin. A drive shaft 35A extends into the mixing chamber 34A and a baffle 40A forms a seal between the drive shaft and the body member at the inlet portion of the mixing chamber. The drive shaft 30A has a fluid passage 140 extending therethrough, terminating at the outlet portion of the mixing chamber in a pair of outlets 141 which are located within a pair of mixing blades 142. A compressible fluid inlet 143 extends through the body member 31A. A pair of O-rings 144 and 145 enclose the drive shaft 35A so as to form a seal and to hold in position a compressible fluid distribution member 146. The compressible fluid distribution member 146 has a U-shaped recess 147 therein, and is disposed so that an aperture 148 located therein is in alignment with the compressible fluid passage 143. The passage 140 through the drive shaft 135A terminates in a right-angle inlet 149, which opens onto the recess 147.

In this embodiment, when it is desired to provide for a spray application of the material mixed, compressible fluid is applied to the passage 143 and passes therethrough, through the aperture 148, and into the recessed portion 147. As the drive shaft 35A rotates, the inlet 149 remains continuously in communication with the recessed portion 147, so that the compressed fluid continuously flows from the recessed portion 147 through the inlet 149, the passage 140 and out the outlets 141. In this embodiment, the illustration of the outlet nozzle has been eliminated for purposes of clarity. However, it is to be understood that the use of an outlet nozzle is preferable in order to provide for a tapering outlet chamber to insure optimum performance.

Thus it is seen that the apparatus of the present invention provides a readily operable mixing gun of the type in which a plurality of liquids, at least one of which is quite viscous, i.e. of a viscosity within the range of magnitude of 100,000 centipoises, mixed together so as to form a homogeneous mixture under pressure, and are expelled from the gun either as a spray or by pouring, as the user may select. In use the homogeneous mixture is expelled from the gun so rapidly that materials which set-up in less than two seconds may readily be utilized. Furthermore, the viscous materials are mixed together without the necessity of reducing their viscosity by heating, as has been the conventional practice heretofore when attempting to make homogeneous mixtures of materials within the above viscosity range.

The invention claimed is:

1. Apparatus for mixing a plurality of fluids comprising:
   A. A body member,
   B. Means forming a cylindrical, longitudinally-extending body mixing chamber within said body member and having an outlet therefrom,
   C. Means forming a cylindrical, laterally-extending valve passage in said body member, said valve passage extending transversely of said mixing chamber,
   D. A mixing element disposed in said mixing chamber,
   E. Drive means attached to said mixing element remote from the outlet and extending through said body member in alignment with said mixing chamber,
   F. A cylindrical valve body disposed in said valve passage,
   G. A plurality of annular seals spaced along the valve body and contacting the wall of the valve passage so as to divide the valve body into a plurality of portions sealed one from another,
   H. A plurality of recesses, said recesses being formed in the valve body between pairs of said seals and extending partially around the valve body, I. A first fluid inlet passage extending through the body member and opening into a first fluid space formed in the valve body by one of said recesses,
J. A first fluid outlet passage extending through the body member from the first fluid space to the mixing chamber,
K. A second fluid inlet passage extending through the body member and opening into a second fluid space formed in the valve body by a second of said recesses,
L. A second fluid outlet passage extending through the body member from the second fluid space to the mixing chamber; and
M. Means connecting the valve body to the body member so that the valve body is angularly displaceable and laterally fixed with respect to the body member.

2. Apparatus according to claim 1 and including a mixing chamber outlet member and means attaching said mixing chamber outlet member to said body member so as to align the mixing chamber outlet and the body mixing chamber in continuous longitudinal mixing chamber passage.

3. Apparatus according to claim 2 and in which the recesses in the valve body are formed in a selected angular array, whereby the rotation of the valve body opens and closes the fluid spaces in sequence.

4. Apparatus according to claim 2 and in which the outlet member is formed of an extensible material tapering conically from a rigid base element.

5. Apparatus according to claim 3 and including a third fluid inlet passage extending through the body member and opening into said first fluid space remote from said first fluid inlet passage opening, whereby rotation of said valve body opens and closes the third fluid inlet passage prior to opening the first fluid inlet fluid passage.

6. Apparatus according to claim 5 and including a fourth fluid inlet passage extending through the body member and opening into a third fluid space formed in the valve body by a third of said recesses, and a third fluid outlet passage extending through the body member from the third fluid space to an outlet portion thereof.

7. Apparatus according to claim 6 and including remote actuator means connected to the outlet portion of the third fluid outlet passage and operable in response to the third fluid to switch between a first and second condition.

8. Apparatus according to claim 6 and in which the third fluid outlet passage opens into that portion of the mixing chamber passage formed between the body mixing chamber and the mixing chamber outlet member.

9. Apparatus according to claim 8 and in which the mixing chamber outlet member attaching means is selectively operable to open and close said third fluid outlet passage opening.

10. Apparatus according to claim 9 and including a fourth fluid outlet passage extending from said third fluid space to an outlet portion thereof in said valve body, remote actuator means connected to said fourth fluid outlet passage outlet portion and operable in response to actuation by said third fluid to shift between a first and second condition of actuation.

References Cited in the file of this patent

UNITED STATES PATENTS

| | | |
|---|---|---|
| 359,602 | Gray | Mar. 22, 1887 |
| 591,067 | Wallace | Oct. 5, 1897 |
| 1,597,033 | Gibbons | Aug. 24, 1926 |
| 1,825,131 | Shepherd | Sept. 29, 1931 |
| 1,895,608 | Conley | Jan. 31, 1933 |
| 2,436,626 | Whittle | Feb. 24, 1948 |
| 2,595,737 | Von Rotz | May 6, 1952 |
| 2,599,465 | Letvin et al. | June 3, 1952 |
| 2,635,010 | Sanders et al. | Apr. 14, 1953 |
| 2,690,901 | McCormack | Oct. 5, 1954 |
| 2,705,132 | Neville | Mar. 29, 1955 |
| 2,788,337 | Preiswerk et al. | Apr. 9, 1957 |
| 2,878,063 | Kish et al. | Mar. 17, 1959 |
| 2,878,633 | Mullin | Mar. 24, 1959 |
| 2,915,301 | Selden | Dec. 1, 1959 |
| 2,970,773 | Keryluk et al. | Feb. 7, 1961 |
| 3,027,096 | Giordano | Mar. 27, 1962 |
| 3,029,027 | Gray | Apr. 10, 1962 |
| 3,035,775 | Edwards et al. | May 22, 1962 |

FOREIGN PATENTS

| | | |
|---|---|---|
| 1,183,805 | France | Feb. 2, 1959 |